(12) United States Patent
Yoo et al.

(10) Patent No.: US 8,947,467 B2
(45) Date of Patent: Feb. 3, 2015

(54) DISPLAY DEVICE AND GAMMA SETTING METHOD FOR THE SAME

(75) Inventors: Gi-Na Yoo, Yongin (KR); Duk-Jin Lee, Yongin (KR); Seung-Jae Jeong, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 659 days.

(21) Appl. No.: 13/013,181

(22) Filed: Jan. 25, 2011

(65) Prior Publication Data

US 2011/0273626 A1    Nov. 10, 2011

(30) Foreign Application Priority Data

May 4, 2010    (KR) .................. 10-2010-0042116

(51) Int. Cl.
| | |
|---|---|
| *H04N 5/66* | (2006.01) |
| *G09G 5/10* | (2006.01) |
| *G09G 3/32* | (2006.01) |
| *H04N 5/58* | (2006.01) |

(52) U.S. Cl.
CPC ...... *G09G 3/3225* (2013.01); *G09G 2320/0633* (2013.01); *G09G 2320/0673* (2013.01); *G09G 2360/144* (2013.01); *H04N 5/58* (2013.01)
USPC .......................................... 345/690; 345/207

(58) Field of Classification Search
USPC .................................................. 345/690, 207
See application file for complete search history.

(56) References Cited

U.S. PATENT DOCUMENTS

| | | | |
|---|---|---|---|
| 7,595,795 B2 | 9/2009 | Shin et al. | |
| 2002/0186230 A1* | 12/2002 | Kudo et al. | 345/690 |
| 2006/0202929 A1* | 9/2006 | Baum et al. | 345/89 |
| 2006/0268299 A1* | 11/2006 | Nose et al. | 358/1.9 |
| 2009/0033645 A1* | 2/2009 | Araya | 345/205 |

FOREIGN PATENT DOCUMENTS

| | | |
|---|---|---|
| KR | 1020050113847 A | 12/2005 |
| KR | 1020050119559 A | 12/2005 |
| KR | 10-2006-0050027 | 5/2006 |
| KR | 10-2008-0076203 | 8/2008 |
| KR | 10-2009-0011471 | 2/2009 |
| KR | 10-2009-0037655 | 4/2009 |
| KR | 1020100021356 A | 2/2010 |

* cited by examiner

*Primary Examiner* — Amare Mengistu
*Assistant Examiner* — Jennifer Zubajlo
(74) *Attorney, Agent, or Firm* — Robert E. Bushnell, Esq.

(57) ABSTRACT

A display device receiving a video signal including grayscale data and displaying images according to the input video signal includes: a photosensor measuring illuminance of external light; a timing controller processing the data signal according to a target gamma value corresponding to the measured illuminance among a plurality of gamma values for a reference curved line representing a relationship of a lightness variation according to a change of grayscale data to be applied to the measured illuminance environment; a data driver applying the processed data signal to a plurality of pixels; and a scan driver applying a scan signal to the plurality of pixels for the data signal to be applied to the plurality of pixels. Accordingly, an image or a motion picture may be displayed with a desired grayscale without influence of external light, and the display quality may be obtained in an external light environment without increasing power consumption.

9 Claims, 7 Drawing Sheets

DISPLAY DEVICE AND GAMMA SETTING METHOD FOR THE SAME

CLAIM OF PRIORITY

This application makes reference to, incorporates the same herein, and claims all benefits accruing under 35 U.S.C §119 from an application entitled DISPLAY DEVICE AND GAMMA SETTING METHOD FOR THE SAME earlier filed in the Korean Industrial Property Office on May 4, 2010, and there duly assigned Serial No. 10-2010-0042116 by that Office.

BACKGROUND OF THE INVENTION

1. Field of the Invention

The present invention relates to a display device and a gamma setting method for the display device. More particularly, the present invention relates to a display device and a gamma setting method for the display device capable of ensuring display quality of a display device when considering influence of external light.

2. Description of the Related Art

Various kinds of flat display devices that are capable of reducing detriments of cathode ray tubes (CRT) such as their heavy weight and large size have been developed in recent years. Such flat display devices include liquid crystal displays (LCDs), field emission displays (FEDs), plasma display panels (PDPs), and organic electroluminescence display devices.

In a flat panel display, contrast may be deteriorated according to influence of external light. To solve this trouble, the flat panel display module may be with an external light detector such as photosensor in order to control the luminance according to the detected external light. Generally, the flat panel display controls an intermediate grayscale expression to have a gamma curve of a 2.2 value. This is because the luminance as a physical measurement value and the lightness that is recognized by a user does not have a linear characteristic. If the expression of the intermediate grayscale is controlled to have a 2.2 gamma curve, the display characteristic in which the user naturally recognizes the lightness may be linearly obtained. However, when the luminance range capable of expressing the display of the flat panel display is changed by the influence of external light, the power value of the gamma function ensuring the linearity of the lightness change according to the grayscale change is changed. As a result, when the visual characteristic of the user is not reflected, natural display may be not realized under the driving of images or a motion picture.

A flat panel display and a gamma setting method therefor capable of improving the display is quality by compensating the gamma to realize the grayscale expression reflecting the visual characteristic of the user according to the external light are required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a display device capable of improving the display quality by compensating the gamma to realize grayscale expression reflecting visual characteristics of the user according to external light.

The present invention provides a gamma setting method capable of improving display quality of grayscale expression according to the external light through gamma compensation, always maintaining the same lightness change for the same grayscales expression without the influence of the external light, and ensuring the display quality for the external light without increasing the power consumption.

A display device receiving a video signal including grayscale data and displaying images according to the input video signal according to an exemplary embodiment of the present invention includes: a photosensor measuring illuminance of external light; a timing controller processing the data signal according to a target gamma value corresponding to the measured illuminance among the plurality of gamma values for a reference curved line representing a relationship of a lightness variation according to a change of the grayscale data to be applied to the measured illuminance environment; a data driver applying the processed data signal to a plurality of pixels; and a scan driver applying a scan signal to the plurality of pixel for the data signal to be applied to the plurality of pixels.

A reference curved line is set by a relationship between the change of the grayscale data and the value of which the lightness variation according to the change of the grayscale data is divided by the entire range of the lightness that can be displayed by the display device. The reference curved line may be a relationship curved line between $(\Delta L^*/\Delta Gray)/(L^*\_max - L^*\_min)$ and $\Delta Gray$, where $\Delta L^*$ is the change of the lightness, $\Delta Gray$ is the change of the grayscale, $L^*\_max$ is a maximum value of the lightness that can be displayed, and $L^*\_min$ is a minimum value of the lightness that can be displayed.

The target gamma value may be a gamma value with reference to a dark room. The target gamma value may be 2.2.

The timing controller may constitute and store the gamma value satisfying the reference curved line for the illuminance of the external light measured from the photosensor as a table.

A method of setting a gamma value for a display device according to another exemplary embodiment of the present invention includes: setting a target gamma value; setting a reference curved line of a variation of lightness according to a change of a grayscale for a range of lightness that can be displayed for the grayscale of the display device by applying the target gamma value; and setting a gamma value satisfying the reference curved line for illuminance of external light.

The setting of the gamma value satisfying the reference curved line may be executed for a variation curved line of the lightness according to the change of the grayscale for the range of the lightness that can be displayed for the illuminance of the external light to be similar to the reference curved line. The setting of the gamma value satisfying the reference curved line may be executed for the set gamma value to be less than the target gamma value as the illuminance of the external light is increased.

The target gamma value may be the gamma value with reference to a dark room.

Accordingly, the image or the motion picture may be displayed with the desired grayscale without influence of the external light, and the display quality may be obtained in the external light environment without increasing the power consumption.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Figure 1:
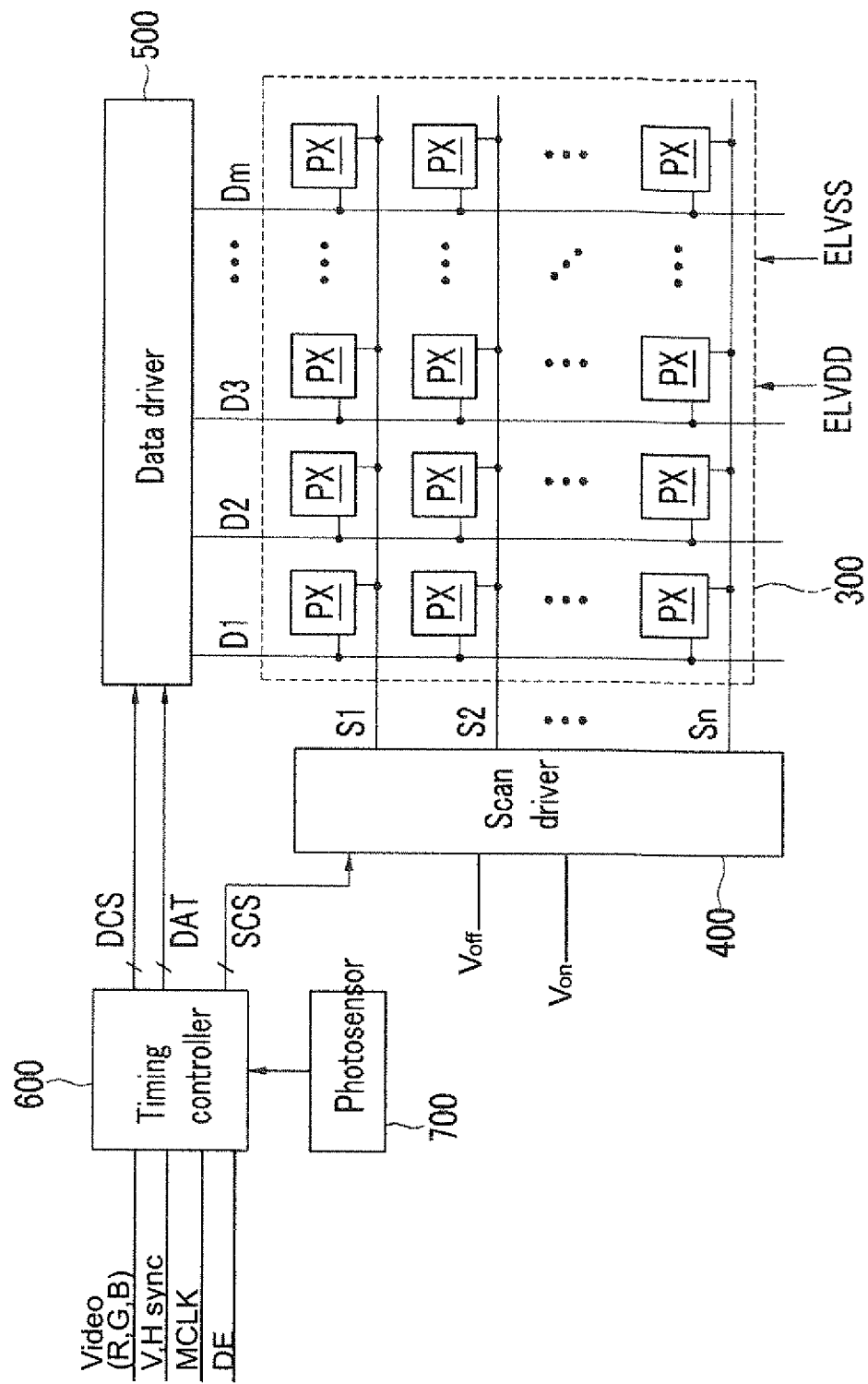
FIG. 1 is a block diagram of an organic light emitting diode (OLED) display according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Constituent elements having the same structures throughout the embodiments are denoted by the same reference numerals and are described in a first exemplary embodiment. In the other exemplary embodiments, only constituent elements other than the same constituent elements are described.

To clearly describe the exemplary embodiments of the present invention, parts not related to the description are omitted, and like reference numerals designate like constituent elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Next, a display device and a driving method therefor capable of expressing the image or the motion picture into the desired grayscale without influence of the external light and ensuring the display quality in the external light environment without increased power consumption will be described. An example of an organic light emitting diode (OLED) display is described, however the proposed gamma setting method is not limited thereto, and may be applied to various flat panel displays receiving influence of external light.

FIG. 1 is a block diagram of an organic light emitting diode (OLED) display according to an exemplary embodiment of the present invention.

Referring to FIG. 1, an organic light emitting diode (OLED) display includes a display unit 300, a scan driver 400, a data driver 500, a timing controller 600, and a photosensor 700.

The timing controller 600 generates a data driving control signal DCS and a scan driving control signal SCS corresponding to synchronizing signals supplied from an external device. The data driving control signal DCS generated in the timing controller 600 is provided to the data driver 500, and the scan driving control signal SCS is provided to the scan driver 400. Also, the timing controller 600 provides the data signal DAT supplied from the external device to the data driver 500.

The scan driver 400 is connected to a plurality of scan lines S1 to Sn of the display unit to apply a scan signal to the plurality of scan lines S1 to Sn. The scan signal is formed of a combination of the gate-on voltage Von that turns on the switching transistor (M1 of FIG. 2) and is a gate-off voltage Voff that that turns off the switching transistor M1.

The data driver 500 is connected to the data lines D1-Dm of the display unit 300, and selects a gray voltage according to the data signal DAT provided from the timing controller 600. The data driver 500 applies the selected gray voltage as the data signal to the plurality of data lines D1-Dm. The display unit 300 includes a plurality of scan lines S1-Sn, a plurality of data lines D1-Dm, and a plurality of pixels PX. The plurality of pixels PX are connected to the plurality of signal lines S1-Sn and D1-Dm and arranged in an approximate matrix. The scan lines S1-Sn extend in an approximate row direction and are parallel to each other, and the data lines D1-Dm extend in an approximate column direction and are parallel to each other. The display unit 300 receives an ELVDD power and an ELVSS power, and supplies them to each pixel PX. Each pixel PX receives the data signal when the scan signal is applied, thereby light-emitting an organic light emitting diode (OLED) corresponding to the data signal.

The photosensor 700 measures illuminance of the external light and converts it into an electrical signal to provide it to the timing controller 600. The timing controller 600 controls the scan driver 400 and the data driver 500 according to the signal from the photosensor 700.

Each of the drivers 400, 500, and 600 may be directly mounted on the display unit 300 in the form of at least one IC chip, may be mounted on a flexible printed circuit film (not shown) and then mounted on the display unit 300 in the form of a tape carrier package (TCP), or may be mounted on a separate printed circuit board (not shown). Alternatively, the drivers 400, 500, and 600 may be integrated with the display unit 300 together with, for example, the signal lines S1-Sn.

Figure 2:
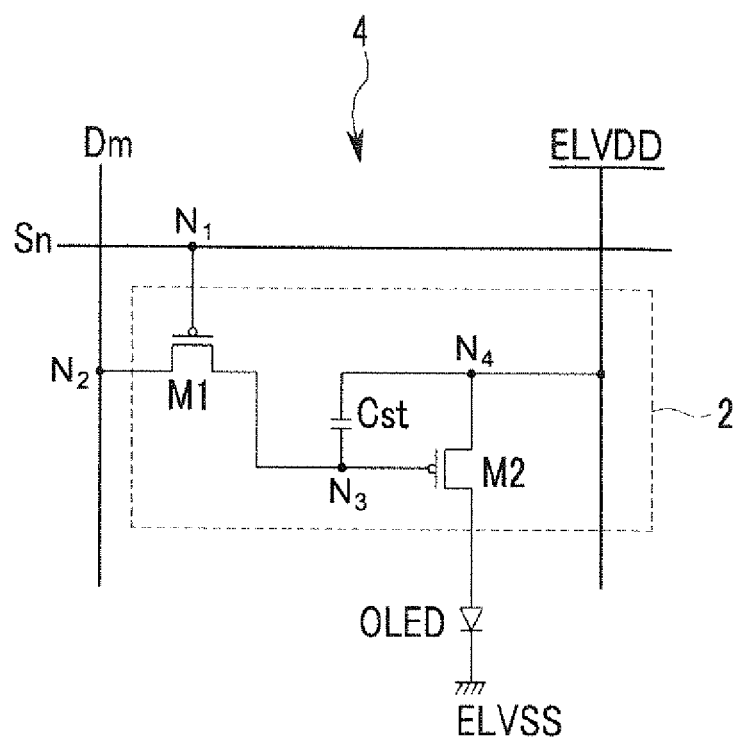
FIG. 2 is a circuit diagram of a pixel of FIG. 1.

FIG. 2 is a circuit diagram of a pixel of FIG. 1.

Referring to FIG. 2, the pixel 4 of the organic light emitting diode (OLED) display includes an organic light emitting diode (OLED), and a pixel circuit 2 connected to the data line Dm and the scan line (Sn) and controlling the organic light emitting diode (OLED).

An anode of the organic light emitting diode (OLED) is connected to the pixel circuit 2, and a cathode thereof is connected to the ELVSS power. The organic light emitting diode (OLED) generates light of a predetermined luminance corresponding to the current supplied from the pixel circuit 2.

The pixel circuit 2 controls the current amount supplied to the organic light emitting diode (OLED) corresponding to the data signal supplied to the data line Dm when the scan signal is applied to the scan line Sn. For this, the pixel circuit 2 includes a driving transistor M2 provided between the ELVDD power and the organic light emitting diode (OLED), a switching transistor M1 provided between driving transistor M2, the data line Dm, and the scan line Sn, and a storage capacitor Cst provided between the gate electrode of the driving transistor M2 and the first electrode.

The gate electrode of the switching transistor M1 is connected to the scan line Sn at node N1, a first electrode is connected to the data line Dm at node N2, and a second electrode is connected to the gate electrode of the second transistor M2 and one terminal of the storage capacitor Cst at node N3. The switching transistor M1 is turned on if the scan signal from the scan line Sn is applied, and the data signal applied from the data line Dm is provided to the driving transistor M2 and the storage capacitor Cst. The storage capacitor Cst is charged with the voltage corresponding to the data signal.

The gate electrode of the driving transistor M2 is connected to one terminal of the storage capacitor Cst at node N3, a first electrode is connected to the other terminal of the storage capacitor Cst and the ELVDD power at node N4, and a second electrode is connected to the anode electrode of the organic light emitting diode (OLED). The driving transistor M2 controls the amount of current flowing to the organic light emitting diode (OLED) from the ELVDD power corresponding to the voltage value stored in the storage capacitor Cst. The organic light emitting diode (OLED) generates light corresponding to the current amount provided through the driving transistor M2.

The organic light emitting diode OLED can emit light having one among primary colors. Examples of the primary colors may include three primary colors of red, green, and blue, and a desired color is displayed by a spatial or temporal sum of these three primary colors. In this case, some organic light emitting diodes OLED may emit white light, and thus luminance increases. Unlike this, the organic light emitting diode OLED of all the pixels PX may emit white light, and some pixels PX may further include a color filter (not shown) that converts the white light emitted from the organic light emitting diode OLED into any one light of the primary colors.

The switching transistor M1 and the driving transistor M2 may be a p-channel field effect transistor (FET). However, at least one of the driving transistor M2 and the switching transistor M1 may be an n-channel field effect transistor. Further, the connection relationship of the transistors M1 and M2, the capacitor Cst, and the organic light emitting diode (OLED) may be changed The pixel PX shown in FIG. 2 is one example of one pixel of the display device, and a pixel of a different type including at least two transistors or at least one capacitor may be adopted.

A driving method of a display device according to an exemplary embodiment of the present invention will now be described.

The timing controller 600 receives video signals R, G, and B input from an external device and input control signals for controlling display of the input video signals. The video signals R, G, and B include luminance information of each pixel PX, and the luminance has a predetermined number of grays, for example $1024=2^{10}$, $256=2^8$, or $64=2^6$. That is, the video signal includes the grayscale data. The input control signals exemplarily include a vertical synchronization signal (Vsync), a horizontal synchronization signal Hsync, a main clock signal MCLK, and a data enable signal DE.

The timing controller 600 processes the input video signals R, G, and B for operation conditions of the display unit 300 and the data driver 500 based on the input video signals R, G, and B and the input control signals, and generates a data driving control signal DCS and a scan driving control signal SCS. The scan driving control signal SCS is provided to the scan driver 400, and the data driving control signal DCS and the processed data signal DAT are provided to the data driver 500.

Here, the timing controller 600 sets the gamma value when considering the influence of the external light and executes the process of treating the data signal DAT. The photosensor 700 measures the illuminance of the external light to convert it into an electrical signal and output it to the timing controller 600. For example, the photosensor 700 increases the voltage or the current according to the increase of the illuminance of the external light, thereby representing the illuminance information. The timing controller 600 processes the data signal according to the gamma value corresponding to the measured illuminance among a plurality of predetermined gamma values for a reference curved line representing a relationship of a lightness variation according to the change of the grayscale data to be adjusted to the illuminance environment of the measured external light. A method of obtaining a reference curved line and a method of setting the gamma value corresponding to the illuminance of the external light will be described later.

The data driver 500 receives the data signal DAT from the timing controller 600 and selects the gray voltage corresponding to the data signal DAT to convert the data signal DAT into the analog data signal. The data driver 500 applies the plurality of data signals for the plurality of pixels PX of one pixel row among the plurality of pixels to the corresponding data lines D1-Dm according to the data driving control signal DCS.

The scan driver 400 applies the gate on voltage Von to the scan lines S1-Sn according to the scan driving control signal SCS such that the switching transistors M1 connected to the scan lines S1-Sn are turned on. The plurality of data signals applied to the data lines D1-Dm are respectively transmitted to one terminal of the storage capacitor Cst through the turned-on switching transistors M1 of the corresponding pixels PX. The storage capacitor Cst is charged with the voltage corresponding to the data signal. The driving transistor M2 turns on the current flowing to the organic light emitting diode (OLED) from the ELVDD power corresponding to the stored voltage in the storage capacitor Cst. The organic light emitting diode (OLED) generates the light corresponding to the current amount provided through the driving transistor M2.

By repeating the process in units of one horizontal period (referred to as "1H", the same as one period of a horizontal synchronizing signal Hsync and a data enable signal DE), the gate-on voltage Von is sequentially applied to all scan lines S1-Sn and the image data signal is applied to all pixels PX so that an image of one frame is displayed according to the plurality of data voltages.

Figure 3:
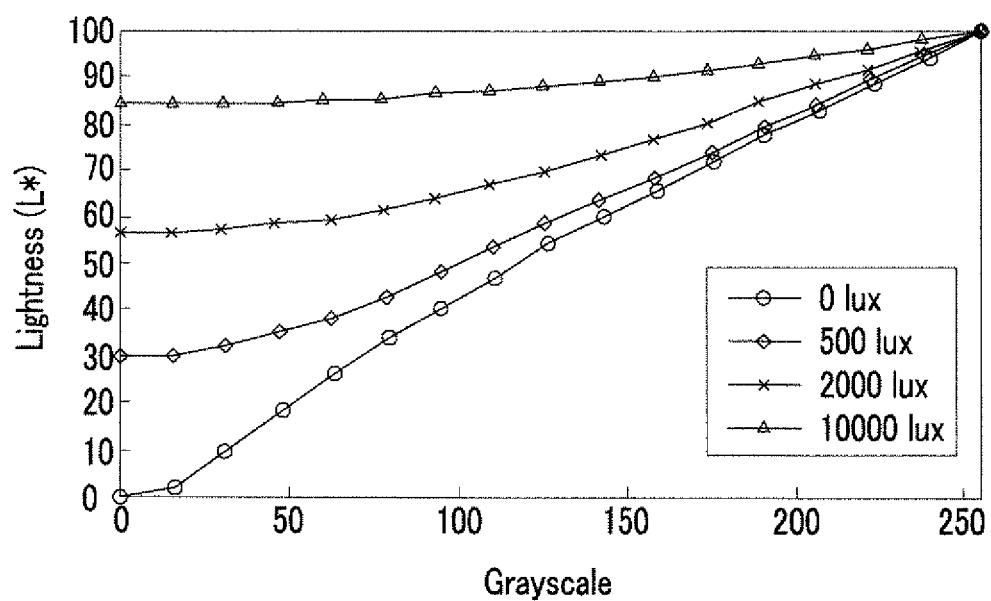
FIG. 3 is graph showing a relationship of lightness for a grayscale according to external light.
Figure 4:
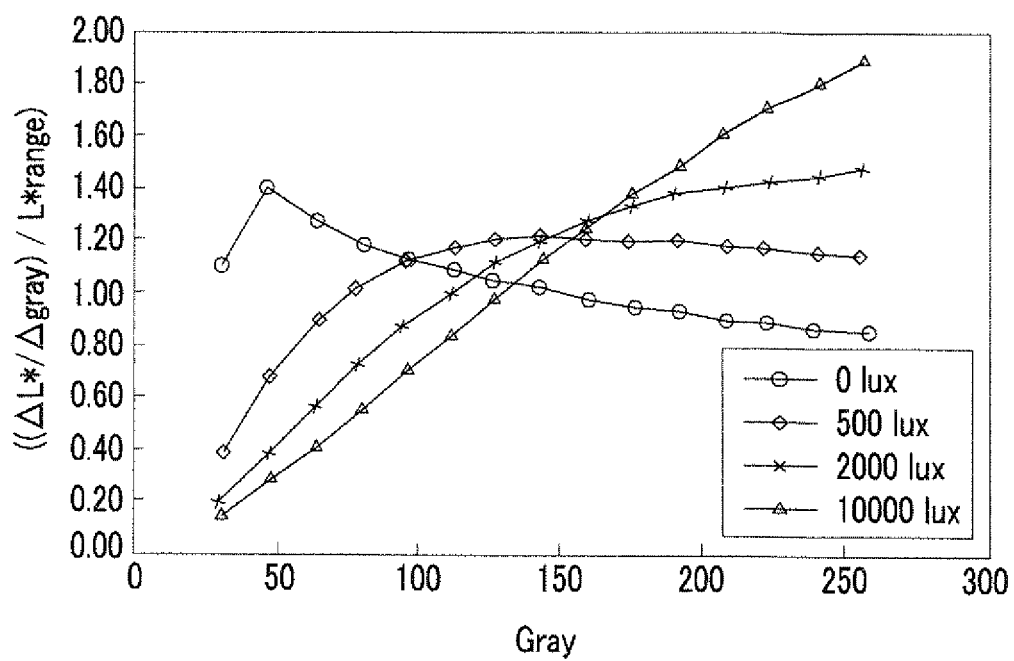
FIG. 4 is a graph showing a relationship of a lightness variation for a grayscale change considering a lightness range in the graph of FIG. 3.
Figure 5:
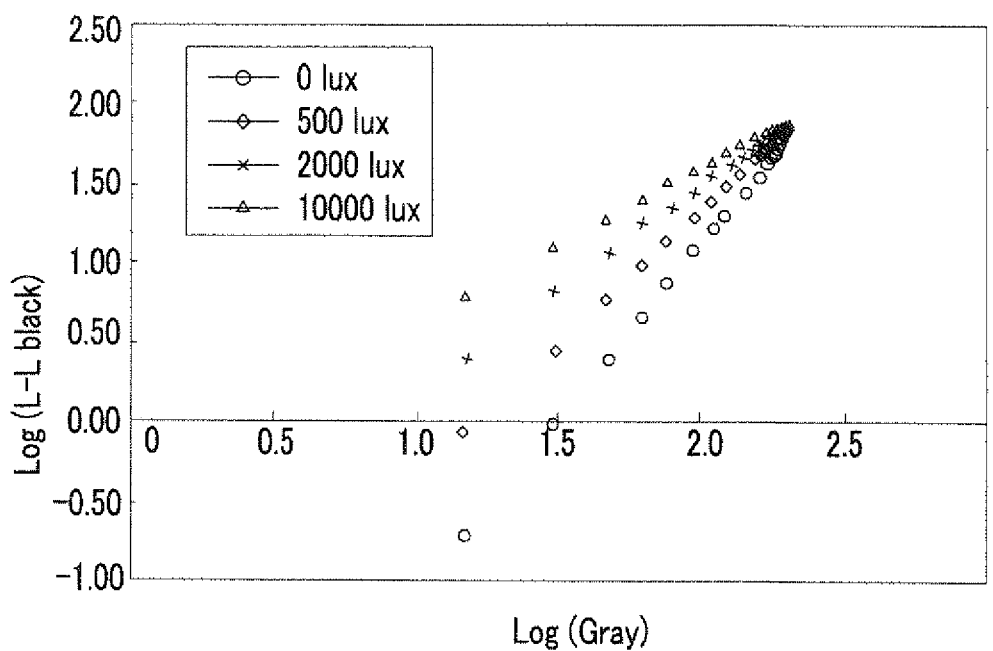
FIG. 5 is a graph showing a gamma setting according to an external light according to an exemplary embodiment of the present invention.
Figure 6:
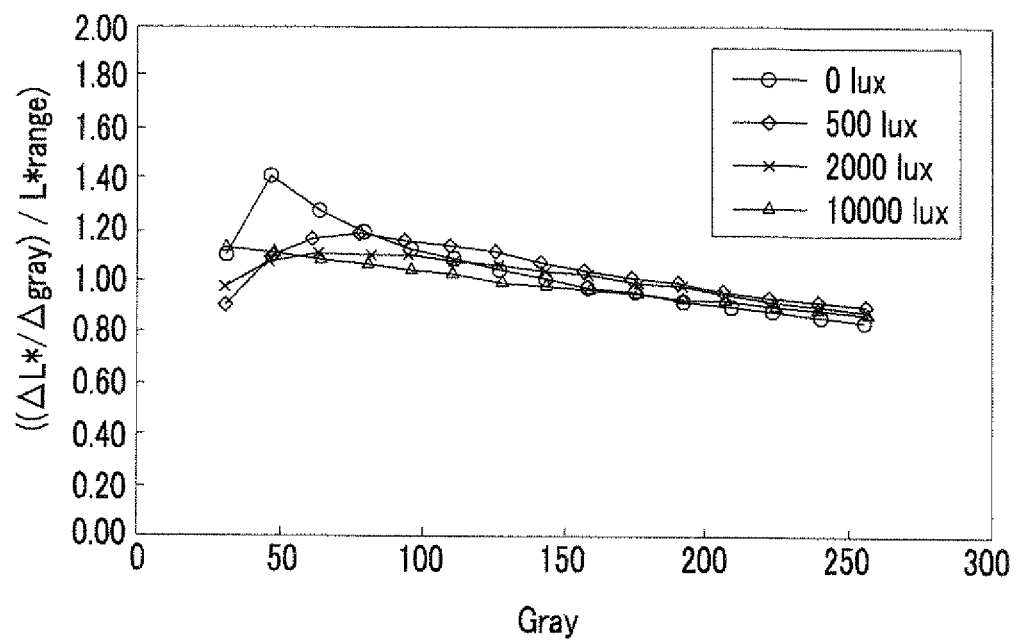
FIG. 6 is a graph showing a relationship of a lightness variation for a grayscale change when considering a lightness range controlled according to the gamma setting of FIG. 5.
Figure 7:
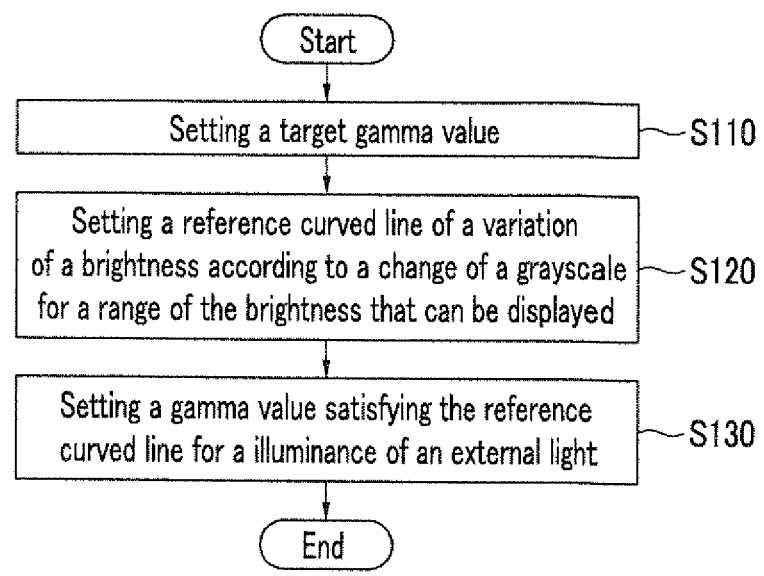
FIG. 7 is a flowchart showing a method of setting a gamma value according to an exemplary embodiment of the present invention.

Next, a method of obtaining the reference curved line and a method of setting the gamma value corresponding to the illuminance of the external light will be described with reference to FIG. 3 to FIG. 7. FIG. 3 is graph showing a relationship of lightness for a grayscale according to external light. FIG. 4 is a graph showing a relationship of a lightness variation for a grayscale change considering a lightness range in the graph of FIG. 3. FIG. 5 is a graph showing a gamma setting according to external light according to an exemplary embodiment of the present invention. FIG. 6 is a graph showing a relationship of a lightness variation for a grayscale change when considering a lightness range controlled according to the gamma setting of FIG. 5. FIG. 7 is a flowchart showing a method of setting a gamma value according to an exemplary embodiment of the present invention.

In the graph of FIG. 3, the horizontal axis represents the grayscale, and the vertical axis represents the lightness L*. The lightness as a relatively sensitive light amount reflecting the visual characteristic uses the value L* of CIELab (Commission Internationale de L'Éclairage (CIE, or translated to English, International Commission on Illumination, or ICI)), and the gamma value is the value applying 2.2 with reference to a dark room. The dark room means a space where the light is blocked, and a bright room means a space where the light exists.

The relationship of the lightness for the grayscale may be represented by Equation 1, where "a" is a constant.

$$L = a\text{Gray}^\gamma \quad \text{(Equation 1)}$$

That is, the luminance is exponentially increased as the grayscale is increased. In the display device, the gamma value corresponding to the exponent uses the gamma value of 2.2 with reference to the dark room. This may be determined as a target gamma.

The range of the lightness capable of being displayed according to the grayscale is decreased as the illuminance of the external light is increased. As shown in the graph of FIG. 3, in the case of the display device having surface reflectance of 5.6% and luminance of 0 grayscale of 0.01 cd/m2, when the illuminance of the external light is 0 lux, the lightness L* may have a range from 0 to 100, when the illuminance of the external light is 500 lux, the lightness L* may have a range from about 30 to 100, when the illuminance of the external light is 2000 lux, the lightness L* may have a range from about 60 to 100, and when the illuminance of the external light is 10000 lux, the lightness L* may have a range from about 85 to 100.

As described above, the range of the lightness to be displayed in the display device is changed according to the illuminance of the external light. In consideration of this point, the lightness variation according to the grayscale change for the range of the lightness that can be displayed may be represented by Equation 2.

$$(\Delta L^*/\Delta\text{Gray})/(L^*\_\max - L^*\_\min) \quad \text{(Equation 2)}$$

Here, $L^*\_\max$ is a maximum value of the lightness that can be displayed, $L^*\_\min$ is a minimum value of the lightness that can be displayed, and $(L^*\_\max - L^*\_\min)$ is a range (L* range) of the lightness that can be displayed.

The graph of FIG. 3 may be represented by a relationship curved line between $(\Delta L^*/\Delta\text{Gray})/(L^*\_\max - L^*\_\min)$ and ΔGray like the graph of FIG. 4 by applying Equation 2. The graph of FIG. 4 represents the variation of the lightness according to the change of the grayscale for the change of the range of the lightness that can be displayed for the illuminance of the external light for the grayscale of the display device. For better understanding and ease of description, this is referred to as a relationship of the lightness variation according to the grayscale change, and this curved line is referred to as a relationship curved line of the lightness variation according to the grayscale change.

As shown in the graph of FIG. 4, it may be confirmed that the variation of the lightness L* according to the grayscale change for the range of the lightness that can be displayed are different according to the illuminance of the external light. When the illuminance of the external light is 0 lux, the variation of the lightness according to the grayscale change for the range of the lightness that can be displayed in the entire grayscale 0-255 is approximately uniform near 1. When the illuminance of the external light is 500 lux, the variation of the lightness according to the grayscale change for the range of the lightness that can be displayed in the 100-255 grayscale is approximately uniform near 1.2, however the variation of the lightness according to the grayscale change for the range of the lightness that can be displayed is increased by less than 100 grayscale as the grayscale is increased. When the illuminance of the external light is 2000 lux and 10000 lux, the variation of the lightness according to the grayscale change for the range of the lightness that can be displayed is small in the low grayscale and is increased as the grayscale is increased.

To increase the driving efficiency and the visibility of the display device, it is preferable that the variation of the lightness according to the grayscale change for the range of the lightness that can be displayed is uniformly maintained. Accordingly, in the graph of FIG. 4, the relationship curved line of the lightness variation according to the change of the grayscale when the external light is 0 lux may be set as the reference curved line. That is, the reference curved line representing the relationship of the lightness variation according to the change of the grayscale may be obtained by Equation 2 by applying the target gamma (e.g., gamma value of 2.2 with reference of the dark room).

For setting the gamma value when considering the illuminance of the external light, the target gamma value is set (S110 of FIG. 7). The target gamma value may be set as the gamma value with reference to the dark room. The gamma value with reference to the dark room may be set as 2.2.

The reference curved line representing the relationship of the lightness variation according to the change of the grayscale is set according to Equation 2 by applying the target gamma value (S120 of FIG. 7). That is, the target gamma value is applied, and the relationship curved line between the variation of the lightness according to the grayscale change for the lightness range that can be displayed and the grayscale change of the display device may be set as the reference curved line.

The gamma value satisfying the reference curved line for the illuminance of the external light is set (S130 of FIG. 7). The relationship curved line of the lightness variation according to the grayscale change for the illuminance of the external light may be obtained according to Equation 2, and the optimized gamma value for the illuminance of the external light may be obtained for the relationship curved lines to be similar to the reference curved line.

In the graph of FIG. 5, the horizontal axis is the log value of the grayscale, the vertical axis is the log value of the luminance, and the slope of the relationship of the log value of the lightness for the log value of the grayscale for the illuminance represents the gamma value set for the illuminance of the external light. In the graph of FIG. 5, it may be confirmed that the set gamma value is less than the target gamma value as the illuminance of the external light is increased.

Table 1 represents one example of the gamma value that is set as described above for the illuminance of the external light in the display device using the reflectance of 5.6%, the luminance of 100 cd/m², and the target gamma of 2.2.

TABLE 1

| External light (lux) | Predetermined gamma value |
|---|---|
| 0 | 2.2 |
| 500 | 1.7 |
| 2000 | 1.3 |
| 10000 | 1 |

As described above, the gamma value for the illuminance of the external light may be constituted by the table. The display device stores the gamma value table for the illuminance of the external light, and may process the data signal by selecting and applying the appropriate set gamma value in the table according to the external light measured in the photosensor 700. The gamma value table for the illuminance of the external light may be previously stored in the timing controller 600 thereby being used for the process of the data signal.

The graph of FIG. 6 shows the relationship curved lines of the lightness variation according to the grayscale change for the illuminance of the external light by applying the set gamma value of Table 1, and the curved lines may be represented similarly to the curved line of 0 lux that applies the target gamma. That is, the relationship curved line of the lightness variation according to the grayscale change of the image displayed from the data signal that is processed by applying the set gamma value is similar to the case of applying the target gamma in the dark room.

As described above, although the external light is an influence, the expression of the same grayscales maintains the same lightness change like the case in which the image displayed from the data signal is applied with the target gamma value, and the display quality may be obtained in the external light environment without increasing the power consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device receiving a video signal including grayscale data, and displaying images according to the input video signal, comprising:

a photosensor measuring illuminance of external light;

a timing controller connected to the photosensor, and receiving and processing a data signal according to a target gamma value corresponding to the measured illuminance among a plurality of gamma values for a reference curved line representing a relationship of a lightness variation according to a change of grayscale data to be applied to the measured illuminance environment, and outputting a processed data signal, the reference curved line being a relationship curved line between $$(\Delta L^*/\Delta Gray)/(L^*\_max - L^*\_min) \text{ and } \Delta Gray,$$

where $\Delta L^*$ is the change of lightness, $\Delta Gray$ is the change of the grayscale, $L^*\_max$ is a maximum value of the lightness that can be displayed, and $L^*\_min$ is a minimum value of the lightness that can be displayed;

a data driver connected to the timing controller for receiving and applying the processed data signal to a plurality of pixels; and a scan driver applying a scan signal to the plurality of pixels for the data signal to be applied to the plurality of pixels, the timing controller constituting and storing the gamma values satisfying the reference curved line for the illuminance of the external light measured by the photosensor, as a table, and selecting a set gamma value in the table.

2. The display device of claim 1, the reference curved line being set by a relationship between the change of the grayscale data and a value of which the lightness variation according to the change of the grayscale data is divided by an entire range of the lightness that can be displayed by the display device.

3. The display device of claim 1, the target gamma value being a gamma value with reference to a dark room.

4. The display device of claim 1, the target gamma value being 2.2.

5. A method setting a gamma value for a display device, comprising the steps of:

storing a plurality of gamma values satisfying a reference curved line with respect to illuminance of an external light as a table;

setting a target gamma value;

setting a reference curved line of a variation of a lightness according to a change of a grayscale for a range of the lightness that can be displayed for the grayscale of the display device by applying the target gamma value, the reference curved line being a relationship curved line between $(\Delta L^*/\Delta Gray)/(L^*\_max - L^*\_min)$ and $\Delta Gray$, where $\Delta L^*$ is the change of lightness, $\Delta Gray$ is the change of the grayscale, $L^*\_max$ is a maximum value of the lightness that can be displayed, and $L^*\_min$ is a minimum value of the lightness that can be displayed;

selecting a set gamma value in the table; and setting the set gamma value satisfying the reference curved line for the illuminance of the external light.

6. The method of claim 5, the setting of the set gamma value satisfying the reference curved line being executed for a variation curved line of the lightness according to the change of the grayscale for a range of the lightness that can be displayed for the illuminance of the external light to be similar to the reference curved line.

7. The method of claim 5, the setting of the set gamma value satisfying the reference curved line being executed for the set gamma value to be less than the target gamma value as the illuminance of the external light is increased.

8. The method of claim 5, the target gamma value being the set gamma value with reference to a dark room.

9. The method of claim 5, the target gamma value being 2.2.

* * * * *